Figures 1, 2, 3:
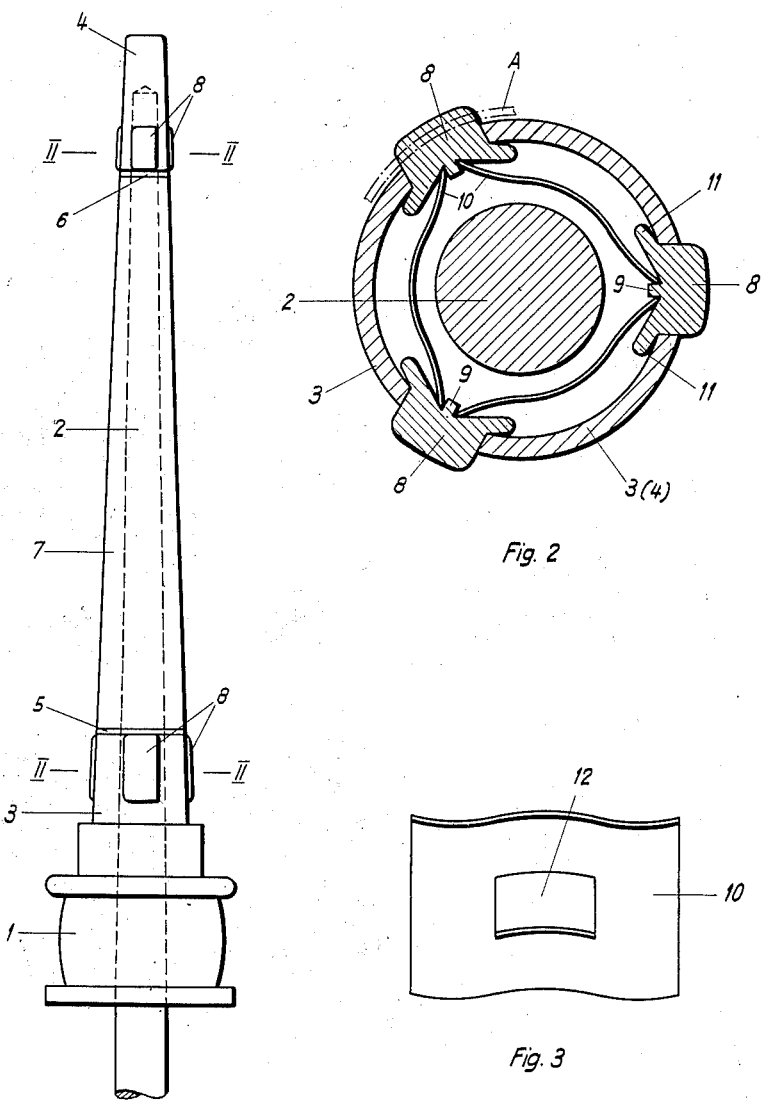

Dec. 2, 1952 W. NAEGELI 2,620,140
RESILIENT DRIVE CONNECTION
Filed Aug. 29, 1947

Inventor
Werner Naegeli
by Sommers & Young
Attorneys

Patented Dec. 2, 1952

2,620,140

UNITED STATES PATENT OFFICE 2,620,140

RESILIENT DRIVE CONNECTION

Werner Naegeli, Winterthur, Switzerland, assignor to Actiengesellschaft Joh. Jacob Rieter & Cie., Winterthur, Switzerland Application August 29, 1947, Serial No. 771,356
In Switzerland September 7, 1946

4 Claims. (Cl. 242—46.3)

For holding and driving the tubes on textile spindles, e. g. spinning spindles, spring coupling members are often used.

Spindles of special adaptation are fitted with coupling members in form of two helical springs arranged one upon another and crosswise. At the extremities of the springs are fitted spherical holders, which exert a pressure against the tube in direction of the springs. In this, as well as in other designs, the spindles possess only on top a resilient seat for the tube, the lower portion of which is arranged around the spindle with clearance, which readily explains why often the driving engagement of the tube is not perfect; the coupling members slip in the tube, particularly when starting or braking the spindles, and owing to their shape, produce grooves on the inside of the tubes. Thus the seats of the tubes being no more perfect, the latter are difficult to remove and they become very soon useless. A further disadvantage of such couplings is that the superior portion of the tube rests on four points, which makes an exact centering of the tube on the spindle impossible. This disadvantage is further increased by the arrangement of the coupling members in pairs at different heights along the spindle, as the tube is being distorted under the influence of the outward pressure of the springs, such seemingly insignificant distortion being sufficient with the mentioned arrangement of the coupling members to bring the tube in contact with the spindle between two spots of its seat, which, according to experience, results in an irregular running of the spindle. Furthermore, difficulties are experienced with a crosswise arrangement of helical springs, as they require complicated auxiliary means to prevent the former from lateral deflection under working conditions.

My invention relates to a device for holding the tubes of spindles, particularly of spinning spindles, in which flexibly-supported coupling members, arranged on the spindle in the same transversal plane in openings of a holder, are used for holding the tubes on spindles, particularly on spinning spindles.

An object of the invention is to provide two yieldable seats for the tube. Another object of the invention is to prevent the coupling members from slipping in the tube, particularly when starting or braking the spindles. Further objects of the invention are to prevent the formation of grooves inside the tube; to obtain a more perfect seat for the tubes and to make the tubes easily removable; to provide a three-point support for the tube enabling its exact centering on the spindle; finally to prevent the tube from coming into contact with the spindle between two spots of its seat, which would result in an irregular running of the spindle, and also to avoid complicated auxiliary means, which otherwise are necessary when crosswise arranged helical springs are being used, in order to prevent such springs from lateral deflection under working conditions.

The objects of the invention are attained by mechanism for holding the tubes on textile spindles, three or more yieldably-supported coupling members being arranged on the spindle in the same transversal plane. Each coupling member preferably receives a leaf spring, each two leaf springs being supported by the same coupling member without coming into contact with the spindle.

The invention is more particularly described with reference to the accompanying drawing, in which:

Fig. 1 shows a spindle in elevation with a lower and an upper yieldable tube seat or holder, Fig. 2, in a larger scale, a cross-sectional view of a single tube coupling on the lines II—II of Fig. 1.

Fig. 3 the elevation of a leaf spring. Similar numerals refer to similar parts throughout the three views.

Immediately above the wharve 1 (Fig. 1) is arranged a conical holding thimble or tube seat 3 mounted on the spindle 2, such thimble containing the coupling members for the lower tube seat. At the top extremity of the spindle 2 is mounted the conical holding thimble 4, which contains the coupling members for the upper tube seat. The two washers 5 and 6 separate the intermediate conical sleeve 7, mounted on spindle 2, from the two thimbles 3 and 4. The latter contain in three openings the coupling members or jaws 8 for the respective tube seat, said coupling members being arranged in the same transversal plane with regard to the spindle 2; said openings in which fit the jaws 8, are open and accessible on the side facing the washers 5 and 6 respectively, which facilitates the manufacturing and the assembly of the respective parts. Each jaw 8 possesses on the inside a central lug 9, the opposite sides of which support one each of the leaf springs 10; each of the second extremities of the leaf springs 10 being supported by a lug of an adjacent jaw 8. The leaf springs 10 aim to maintain the jaws 8 in their extreme outward position, where the abutments 11 are bearing on the inner side of the thimbles 3 and 4 respectively. The springs 10 are not in contact with spindle 2; they are bent with respect to the transversal plane of the spindle 2 and are provided with an opening 12 (Fig. 3) in their central portion. Thus, the springs 10 bend more easily when a tube for winding on the yarn is mounted onto spindle 2, in such a manner, that the tube comes into contact with the jaws 8 of both seats or thimbles, producing frictional grip. The jaws 8 are then pressed inwards into the thimbles 3 and 4 with a simultaneous further bending of the springs 10. In Fig. 2 a tube A is partially indicated in dash-and-dot-lines; after yarn has been wound on tube A, the cop (including tube A) is removed from the spindle 2 by overcoming the frictional resistance of the jaws 8.

The jaws 8 are oblong and their outside portion, fitting the inside of the tube, possesses rounded edges in order not to damage the inside of the tube.

As the yieldable jaws do not contact the spindle, the seat for the tube may be arranged at the upper extremity of the spindle, just as well as immediately above the wharve. It is, of course, also possible to provide for the tube one seat only according to the invention. The described construction of each separate tube seat, as well as of the complete device, enables a simple assembly.

What I claim is:

1. In a spinning spindle having means for holding a tube thereon, a conical tube support, a wharve connected with the bottom end of said tube support, two tube clutches, one of said clutches being disposed immediately above said wharve and the other clutch being disposed at the top of said tube support, each of said clutches including a plurality of radially movable clutch members projecting from said conical tube support to engage the tube, and leaf springs extending between each two adjacently disposed clutch members to urge the members outwardly, whereby each clutch member serves as support for the ends of two leaf springs, and when the tube is engaged by said clutch members neither the tube nor the clutch members and the leaf springs bear in radial direction on said tube support.

2. In a spinning spindle having means for holding a tube thereon, a conical tube support, a wharve connected with the bottom end of said tube support, two tube clutches disposed above said wharve and on top of the tube support, respectively, each of said clutches including three radially movable and circumferentially spaced clutch members projecting from said conical tube support to engage the tube, and three leaf springs each extending between two adjacent clutch members to urge the members outwardly, each clutch member serving as support for the ends of two leaf springs.

3. A spinning spindle as defined in claim 2, wherein each clutch member is provided with an abutment on its inner side, the ends of said two leaf springs bearing against said abutment.

4. A spinning spindle as defined in claim 2, wherein said leaf springs are provided with a recess in their center portion.

WERNER NAEGELI.

REFERENCES CITED

The following references are of record in the file of this patent:

UNITED STATES PATENTS

| Number | Name | Date |
|---|---|---|
| 1,294,493 | Lemoine et al. | Feb. 18, 1919 |
| 1,478,789 | Magrath | Dec. 25, 1923 |
| 1,832,072 | West | Nov. 17, 1931 |
| 1,895,810 | Magrath | Jan. 31, 1933 |
| 1,956,193 | Gollong | Apr. 24, 1934 |

FOREIGN PATENTS

| Number | Country | Date |
|---|---|---|
| 493,734 | Great Britain | Oct. 13, 1938 |
| 763,507 | France | Feb. 12, 1934 |